United States Patent
Hershman

(10) Patent No.: US 11,055,409 B2
(45) Date of Patent: Jul. 6, 2021

(54) PROTECTED SYSTEM

(71) Applicant: NUVOTON TECHNOLOGY CORPORATION, Hsin-chu (TW)

(72) Inventor: Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 350 days.

(21) Appl. No.: 16/240,747

(22) Filed: Jan. 6, 2019

(65) Prior Publication Data

US 2020/0218808 A1   Jul. 9, 2020

(51) Int. Cl.
*G06F 21/71*   (2013.01)
*G06F 21/56*   (2013.01)
(Continued)

(52) U.S. Cl.
CPC .......... *G06F 21/566* (2013.01); *G06F 21/554* (2013.01); *G06F 21/70* (2013.01);
(Continued)

(58) Field of Classification Search
CPC ........ G06F 21/566; G06F 21/56; G06F 21/55; G06F 21/554; G06F 21/57; G06F 21/577;
(Continued)

(56) References Cited

U.S. PATENT DOCUMENTS

| | | |
|---|---|---|
| 7,590,880 B1 | 9/2009 | Hershman |
| 8,370,787 B2 * | 2/2013 | Koushanfar .......... H04L 9/3278 716/136 |

(Continued)

FOREIGN PATENT DOCUMENTS

| | | |
|---|---|---|
| DE | 102006045905 A1 | 4/2008 |
| GB | 2431258 A | 4/2007 |

(Continued)

OTHER PUBLICATIONS

Guilley et al., "Fault Injection Resilience", Fault Diagnosis and Tolerance in Cryptography, version 9, pp. 1-17, Jan. 17, 2011.

(Continued)

*Primary Examiner* — Kristine L Kincaid
*Assistant Examiner* — Shaqueal D Wade
(74) *Attorney, Agent, or Firm* — Kligler & Associates Patent Attorneys Ltd

(57) ABSTRACT

In one embodiment, a protected system, includes a first apparatus disposed on a silicon chip, and to perform a functional process, a second apparatus disposed on the silicon chip, and to perform a protecting process having a verifiable test result, the first and the second apparatus having a physical layout which interleaves at least part of the first apparatus with at least part of the second apparatus so that an attack on the at least part of the first apparatus also attacks the at least part of the second apparatus, a primary controller to signal the second apparatus to perform the protecting process during a time period that the first apparatus is performing the functional process, and an attack handling controller to perform a protective action to protect the functional process responsively to the protecting process failing to verify the verifiable test result providing an indication that the attack is being performed.

22 Claims, 6 Drawing Sheets

(51) Int. Cl.
*G06F 21/55* (2013.01)
*G06F 21/75* (2013.01)
*G06F 21/70* (2013.01)
*G06F 21/72* (2013.01)
*H04L 29/06* (2006.01)
*G06F 21/57* (2013.01)

(52) U.S. Cl.
CPC .............. *G06F 21/71* (2013.01); *G06F 21/72* (2013.01); *G06F 21/75* (2013.01); *G06F 21/577* (2013.01); *G06F 21/755* (2017.08); *G06F 2221/034* (2013.01); *H04L 63/1416* (2013.01); *H04L 63/1441* (2013.01)

(58) Field of Classification Search
CPC .......... G06F 21/71; G06F 21/75; G06F 21/60; G06F 21/70; G06F 21/72; G06F 21/74; G06F 21/755; G06F 2221/034; H04L 63/1441; H04L 63/1416; H04L 63/14
See application file for complete search history.

(56) References Cited

U.S. PATENT DOCUMENTS

| | | | |
|---|---|---|---|
| 8,375,253 | B2 | 2/2013 | Benoit |
| 9,523,736 | B2 | 12/2016 | Hershman et al. |
| 9,716,502 | B1 | 7/2017 | Sarafianos et al. |
| 9,929,858 | B2 | 3/2018 | Riou |
| 10,013,581 | B2 | 7/2018 | Hershman |
| 2004/0186979 | A1 | 9/2004 | Janke et al. |
| 2007/0115952 | A1* | 5/2007 | Tsuji ...................... H04M 3/08 370/356 |
| 2007/0189536 | A1 | 8/2007 | Gammel et al. |
| 2010/0272253 | A1* | 10/2010 | Matsuda .................. G06F 7/725 380/30 |
| 2010/0332851 | A1 | 12/2010 | Priel et al. |
| 2011/0029828 | A1 | 2/2011 | Bancel et al. |
| 2011/0072222 | A1 | 3/2011 | Wagner et al. |
| 2011/0225432 | A1 | 9/2011 | Trichina |
| 2015/0074159 | A1* | 3/2015 | Poschmann ............... G09C 1/00 708/270 |
| 2015/0161416 | A1* | 6/2015 | Na .......................... G06F 21/71 713/192 |
| 2017/0085369 | A1* | 3/2017 | Riou ...................... H04L 9/004 |
| 2017/0357829 | A1* | 12/2017 | Park ........................ G06F 21/70 |
| 2018/0144228 | A1* | 5/2018 | Dupaquis ................ G06F 21/52 |
| 2020/0142795 | A1* | 5/2020 | Kato .................... G06F 11/2215 |

FOREIGN PATENT DOCUMENTS

| | | |
|---|---|---|
| WO | 2000077596 A1 | 12/2000 |
| WO | 2003092071 A2 | 11/2003 |

OTHER PUBLICATIONS

Lac et al., "Thwarting Fault Attacks using the Internal Redundancy Countermeasure (IRC)", IACR Cryptology ePrint Archive, pp. 1-26, 2017.

Patrick, C., "Software Protection Against Fault and Side Channel Attacks", Masters Thesis, Faculty of the Virginia Polytechnic Institute and State University, pp. 1-77, 2017.

* cited by examiner

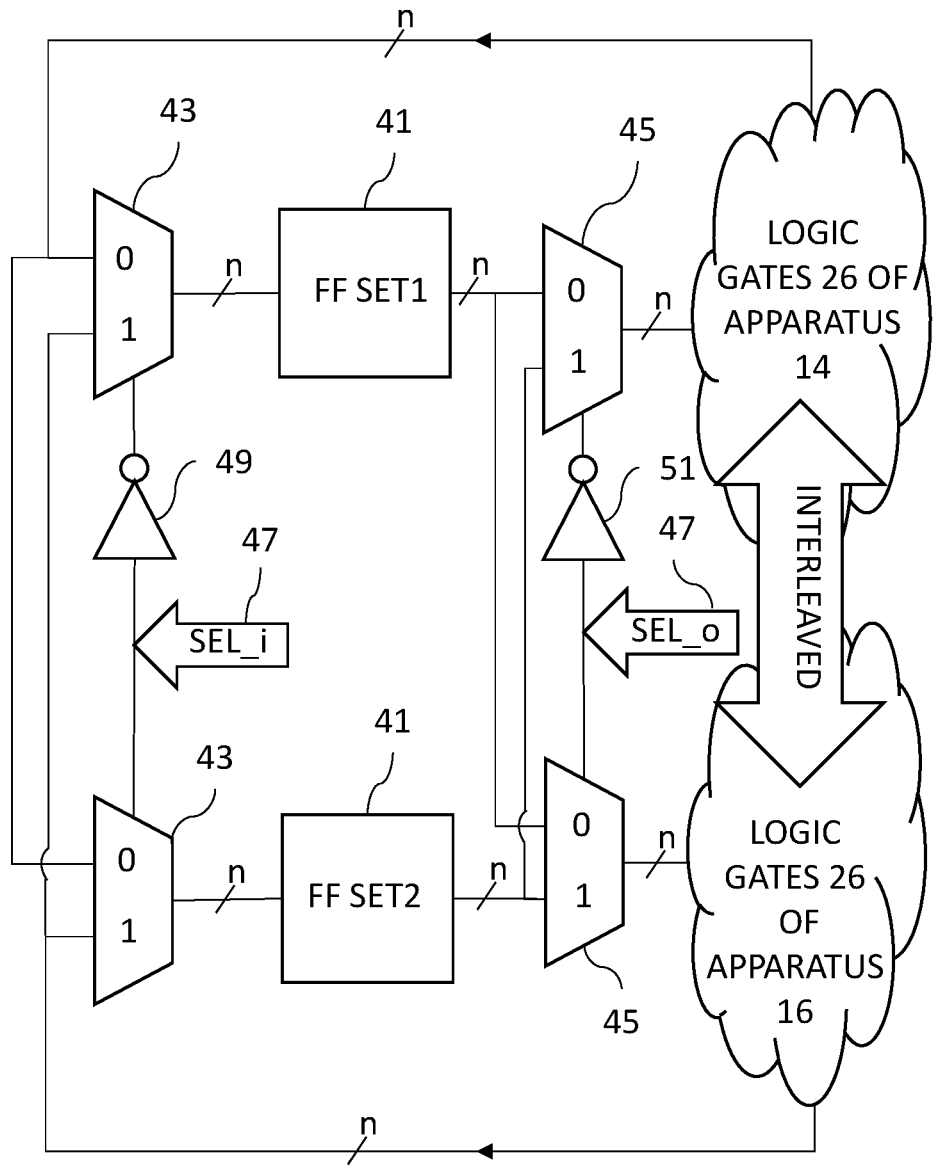

PROTECTED SYSTEM

FIELD OF THE INVENTION

The present invention relates to chip security, and in particular, but not exclusively to, protection against fault injection attacks.

BACKGROUND

Fault injection attacks are a family of techniques used for accessing, analyzing or extracting information from secure electronic circuitry, such as cryptographic circuitry. A fault injection attack typically involves causing a fault in the circuit, e.g., by physically contacting signal lines, by applying high-power laser or electromagnetic pulses, or by causing glitches on power supply or other external interfaces. The fault is expected to cause the circuit to output sensitive information, or otherwise assist the attacker in penetrating the circuit or the information it stores.

Various techniques for detecting and mitigating fault injection attacks are known in the art. For example, U.S. Pat. No. 8,375,253 to Benoit describes a method for detecting faults by perturbations during execution of a computerized code in an electronic device. The computer code includes a sensitive process. The method includes a step of executing a redundant procedure of the sensitive process and a step of inserting a delay between the sensitive process and the redundant procedure. A trapping procedure is executed during the delay. The trapping procedure is sensitive to perturbations and supplies, in the absence of perturbation, a predictable result.

US Patent Publication 2004/0186979 of Janke, et al., describes a processor comprising a first calculating unit, a second calculating unit and a control means for controlling the two calculating units, such that they selectively operate in a high security mode of operation processing complementary data or in a parallel mode of operation processing independent data, or in a security mode of operation processing the same data, or that they are in a power-saving mode of operation, wherein one of the calculating units is switched off.

UK Patent Application GB 2,431,258 of Pomaranski, et al., describes a microprocessor including a plurality of execution units of a same type, and a mode register that is used to selectively turn on and off fault-tolerance features by setting a value in the mode register. This allows the microprocessor to operate selectively in a fault-tolerant mode or in a performance mode (fault-tolerance operations turned off) depending upon whether a program requires fault tolerance. In the fault-tolerant mode, instruction issue/decode unit issues the same instruction to both floating point units (FPUs), i.e. one of the FPUs is used as a redundant execution unit. After execution, comparator compares the respective outputs of FPUs. If the outputs do not match then comparator provides a signal to comparison flag indicating an error.

US Patent Publication 2011/0029828 to Bancel, et al., describes a circuit for detecting a fault injection in an integrated circuit including: at least one logic block for performing a logic function of said integrated circuit; an isolation block coupled to receive a signal to be processed and an isolation enable signal indicating a functional phase and a detection phase of the logic block, the isolation block applying, during the functional phase, the signal to be processed to at least one input of the logic block, and during the detection phase, a constant value to the input of the logic block; and a detection block adapted to monitor, during the detection phase, the state of the output signal of the logic block, and to generate an alert signal in case of any change in the state of the output signal.

U.S. Pat. No. 10,013,581 to Hershman describes an apparatus for detecting fault injection including functional circuitry and fault detection circuitry. The functional circuitry is configured to receive one or more functional input signals and to process the functional input signals so as to produce one or more functional output signals. The functional circuitry meets a stability condition that specifies that stability of a designated set of one or more of the functional input signals during a first-time interval guarantees stability of a designated set of one or more of the functional output signals during a second time interval that is derived from the first-time interval. The fault detection circuitry is configured to monitor the designated functional input and output signals, to evaluate the stability condition based on the monitored functional input and output signals, and to detect a fault injection attempt in response to detecting a deviation from the stability condition.

U.S. Pat. No. 9,523,736 to Hershman, et al., describes an apparatus for detecting fault injection includes a high-fanout network, which spans an Integrated Circuit (IC), and circuitry. In some embodiments, the high-fanout network is continuously inactive during functional operation of the IC, and the circuitry is configured to sense signal levels at multiple sampling points in the high-fanout network, and to identify a fault injection attempt by detecting, based on the sensed signal levels, a signal abnormality in the high-fanout network. In some embodiments, the circuitry is configured to sense signal levels at multiple sampling points in the high-fanout network, to distinguish, based on the sensed signal levels, between legitimate signal variations and signal abnormalities in the high-fanout network during functional operation of the IC, and to identify a fault injection attempt by detecting a signal abnormality.

US Patent Publication 2011/0225432 of Trichina describes a method of detecting a fault attack during a cryptographic operation using at least one look-up table including a plurality of sub-tables each having a same number of values of a fixed bit length, a fixed relation existing between values at same locations in each sub-table, the method including: performing a load operation to retrieve from the look-up table data values from a same location in each sub-table; verifying that the fixed relation exists between at least two of the data values; and generating an output signal based on the verification.

U.S. Pat. No. 7,590,880 to Hershman describes circuitry for detecting and protecting against over-clocking attacks on hardware modules. The circuitry comprises a test signal, a delay path for providing a delayed signal of the test signal, and circuitry for comparing the logical state of the test signal and the delayed signal and issuing an attack indication whenever the signals are different.

U.S. Pat. No. 9,716,502 to Sarafianos, et al., describes an integrated circuit protection device, including: groups of radiation detection elements distributed in a matrix array; logic gates combining outputs of the detection elements in rows and in columns, each output of a detection element being connected to a gate combining a row and to a gate combining a column; and a circuit for interpreting signals supplied by said logic gates and including an event counter and a delay element.

SUMMARY

There is provided in accordance with an embodiment of the present disclosure, a protected system, including a silicon chip, a first apparatus disposed on the silicon chip, and configured to perform a first functional process, a second apparatus disposed on the silicon chip, and configured to perform a first protecting process having a first verifiable test result, wherein the first apparatus and the second apparatus have a physical layout which interleaves at least part of the first apparatus with at least part of the second apparatus so that an attack on the at least part of the first apparatus also attacks the at least part of the second apparatus, a primary controller disposed on the silicon chip, and configured to signal the second apparatus to perform the first protecting process during a time period that the first apparatus is performing the first functional process, and an attack handling controller disposed on the silicon chip, and configured to perform a protective action to protect the first functional process responsively to at least the first protecting process failing to provide the first verifiable test result providing an indication that the attack is being performed.

Further in accordance with an embodiment of the present disclosure the at least part of the first apparatus, which interleaves with at least part of the second apparatus, includes at least 20% of the area on the chip occupied by the first apparatus.

Still further in accordance with an embodiment of the present disclosure, the system includes memory registers that are shared by the first apparatus and the second apparatus, the primary controller being configured to assign a use of the memory registers between the first apparatus and the second apparatus.

Additionally, in accordance with an embodiment of the present disclosure the primary controller is configured to signal the second apparatus to perform the first protecting process all the while that the first apparatus is performing the first functional process.

Moreover, in accordance with an embodiment of the present disclosure the first functional process and the first protecting process perform different processes.

Further in accordance with an embodiment of the present disclosure the first protecting process has a predefined runtime, the attack handling controller being configured to perform the protective action to protect the first functional process responsively to at least the first protecting process failing to run within a predefined tolerance of the predefined runtime.

Still further in accordance with an embodiment of the present disclosure the first protecting process is configured to run in a cyclic fashion over multiple processing cycles, the primary controller being configured to interrupt running of the first protecting process in response to completion of processing by the first functional process.

Additionally, in accordance with an embodiment of the present disclosure the primary controller is configured to control the publication of a second result of the first functional process to be contingent upon the first verifiable test result of the first protecting process being equal to an expected result.

Moreover, in accordance with an embodiment of the present disclosure the primary controller is configured to control acting upon a second result of the first functional process to be contingent upon the first verifiable test result of the first protecting process being equal to an expected result.

Further in accordance with an embodiment of the present disclosure the first apparatus is configured to perform the first functional process as a second protecting process having a second verifiable test result during a time period that the second apparatus is performing a second functional process so that the first apparatus protects the second apparatus against the attack.

Still further in accordance with an embodiment of the present disclosure the first protecting process includes performing a first function yielding an output used as an input to a second function wherein the second function is defined so that the output of the second function equals the input to the first function.

There is also provided in accordance with another embodiment of the present disclosure, a protecting method, including performing a first functional process with a first apparatus disposed on a silicon chip, performing a first protecting process having a first verifiable test result with a second apparatus disposed in the silicon chip, wherein the first apparatus and the second apparatus have a physical layout which interleaves at least part of the first apparatus with at least part of the second apparatus so that an attack on the at least part of the first apparatus also attacks the at least part of the second apparatus, signaling the second apparatus to perform the first protecting process during a time period that the first apparatus is performing the first functional process, and performing a protective action to protect the first functional process responsively to at least the first protecting process failing to provide the first verifiable test result providing an indication that the attack is being performed.

Additionally, in accordance with an embodiment of the present disclosure the at least part of the first apparatus, which interleaves with at least part of the second apparatus, includes at least 20% of the area on the chip occupied by the first apparatus.

Moreover, in accordance with an embodiment of the present disclosure, the method includes assigning a use of memory registers, which are shared by the first apparatus and the second apparatus, between the first apparatus and the second apparatus.

Further in accordance with an embodiment of the present disclosure the signaling includes signaling the second apparatus to perform the first protecting process all the while that the first apparatus is performing the first functional process.

Still further in accordance with an embodiment of the present disclosure the first functional process and the first protecting process perform different processes.

Additionally, in accordance with an embodiment of the present disclosure the first protecting process has a predefined runtime, the method further including performing the protective action to protect the first functional process responsively to at least the first protecting process failing to run within a predefined tolerance of the predefined runtime.

Moreover, in accordance with an embodiment of the present disclosure the first protecting process is configured to run in a cyclic fashion over multiple processing cycles, the method further including interrupting running of the first protecting process in response to completion of processing by the first functional process.

Further in accordance with an embodiment of the present disclosure, the method includes controlling the publication of a second result of the first functional process to be contingent upon the first verifiable test result of the first protecting process being equal to an expected result.

Still further in accordance with an embodiment of the present disclosure, the method includes controlling acting upon a second result of the first functional process to be contingent upon the first verifiable test result of the first protecting process being equal to an expected result.

Additionally, in accordance with an embodiment of the present disclosure, the method includes performing the first functional process as a second protecting process having a second verifiable test result during a time period that the second apparatus is performing a second functional process so that the first apparatus protects the second apparatus against the attack.

Moreover, in accordance with an embodiment of the present disclosure the first protecting process includes performing a first function yielding an output used as an input to a second function wherein the second function is defined so that the output of the second function equals the input to the first function.

BRIEF DESCRIPTION OF THE DRAWINGS

The present invention will be understood from the following detailed description, taken in conjunction with the drawings in which:

FIG. 2C is a schematic view of a shared register arrangement for use in the system of FIG. 1;

DESCRIPTION OF EXAMPLE EMBODIMENTS

Overview

Figure 1:
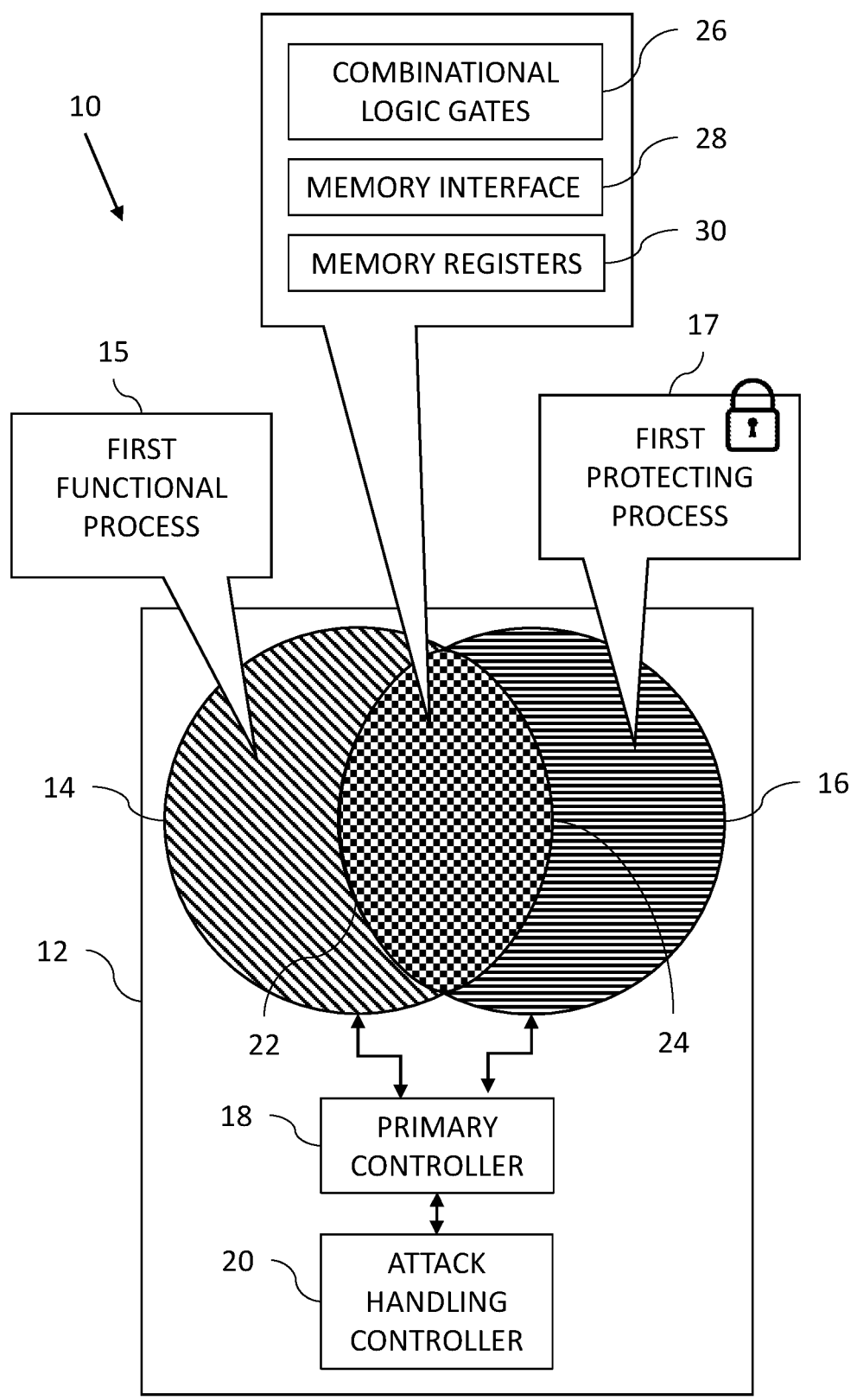
FIG. 1 is a block diagram view of a protected system constructed and operative in accordance with an embodiment of the present invention.

A fault injection attack typically involves causing a fault in the circuit, e.g., by physically contacting signal lines, by applying high-power laser or electromagnetic pulses, or by causing glitches on power supply or other external interfaces. The fault is expected to cause the circuit to output sensitive information, or otherwise assist the attacker in penetrating the circuit or the information it stores.

In embodiments of the present invention, fault injection attacks are mitigated based on using a synergy of physical and logical protection. A protecting apparatus running a protecting process with a verifiable test result runs in parallel to a protected apparatus running a functional process. The protecting and protected apparatus are disposed on a silicon chip in a physical layout which interleaves at least a part of the protecting apparatus with at least a part of the protected apparatus so that an attack on the part of the protected apparatus also attacks the part of the protecting apparatus.

Therefore, when the interleaved part of the protected apparatus is attacked (e.g., with a glitch or electro-magnetic (EM) field or laser beam, etc.), the protecting apparatus is also attacked resulting in the protecting process not yielding the verifiable test result and thereby detecting the attack. Detection of the attack is generally followed by performing a protective action.

A primary controller disposed on the silicon chip, signals the protecting apparatus to perform the protecting process during a time period, and generally all the while, that the protected apparatus is performing the functional process, thereby providing continuous protection to the functional process.

An attack handling controller (which may also be implemented by the primary controller) disposed on the silicon chip, performs the protective action to protect the functional process responsively to the protecting process failing to provide the verifiable test result. The protective action may also include withholding publication of, and/or preventing acting on, a result of the functional process. In some embodiments, the publication of the result of the functional process is not published and/or the result is not acted upon, until after successful verification of the verifiable test result of the protecting process. For example, the result of the functional process may be authorizing or denying access (e.g., to another process or a secret or any other secured resource) or providing a toggle of an I/O signal that opens a physical lock based on authenticating a password. In such a case, authorizing the access to the other process etc. is delayed until after successful verification of the verifiable test result of the protecting process.

The interleaving between elements of the apparatuses may include elements of the protected apparatus being, at least partially, enveloped by elements of the protecting apparatus. The elements being protected may include combinational logic gates, a part of a memory interface, volatile memory elements (e.g., memory registers) such as latches, flip-flops, and random-access-memory (RAM), non-volatile memory elements such as one-time-programmable (OTP), Electrically Erasable Programmable Read-Only Memory (EEPROM) and flash memory, or any other sensitive element of the protected apparatus. The apparatuses may include memory registers that are shared (e.g., time-shared) by the protecting and protected apparatus. The primary controller generally assigns use of the memory registers between the apparatuses. The use of shared registers enhances interleaving of sensitive elements as well as keeping attackers guessing which apparatus they need to attack.

In some embodiments, the protecting process and the functional process are different processes. For example, the protecting process may perform a Rivest-Shamir-Adleman (RSA) cryptographic process, whereas the functional process may perform an Advanced Encryption Standard (AES) cryptographic process.

The protecting process may have a predefined runtime, which may also be checked. The attack handling controller may perform the protective action to protect the functional process responsively to the protecting process failing to run within a predefined tolerance of the predefined runtime.

In some embodiments, the protecting process may run in a cyclic fashion over multiple processing cycles feeding the output of one processing cycle into the input of the next processing cycle. Once the functional process completes, the cyclic running of the protecting process is interrupted. In other embodiments, the protecting process may be set to run for a given number of processing cycles corresponding to the expected run time of the functional process running on the protected apparatus. When the protecting process is run in a cyclic fashion the verifiable test result may be checked at the end of every processing cycle or at the end of the last processing cycle. The term "processing cycle" as used in the specification and claims is defined to mean a single execution of the protecting process, which may include one or more operations on a data value, such as a first operation on a data value and then performing an inverse operation on the resulting data value from the first operation.

For the sake of convenience, when the verifiable test result is checked at the end of the last processing cycle, the protecting process typically includes performing a first function yielding an output used as an input to a second function wherein the second function is defined so that the output of the second function equals the input to the first function, for example, encrypting a data value yielding an output and then decrypting the output to yield the original data value. Other similar functions may include, addition followed by subtraction, multiplication followed by division, performing a reciprocal followed by another reciprocal, etc. The input to the first function in each processing cycle may be the same value, a counter value, a random value or any other suitable value. The above functions may also be used when the verifiable test result is checked at the end of each processing cycle. In some embodiments, the verifiable test result may be compared to a precalculated expected result.

In some embodiments, the roles of the protecting apparatus and protected apparatus may be reversed so that the apparatus which was previously protected is now the protecting apparatus and now protects the apparatus which was previously the protecting apparatus. By way of example, if the protecting apparatus was running RSA and was protecting the apparatus running AES which at that time was part of the functional operation of the chip, the roles may be reversed so that the apparatus running AES now protects the apparatus currently running RSA as part of the functional operation of the chip.

System Description

Reference is now made to FIG. 1, which is a block diagram view of a protected system 10 constructed and operative in accordance with an embodiment of the present invention. The protected system 10 includes a silicon chip 12, a first apparatus 14, a second apparatus 16, a primary controller 18, and an attack handling controller 20.

The first apparatus 14 is disposed on the silicon chip 12, and is configured to perform a first functional process 15. The first functional process 15 is generally a data transformation process that transforms an original data value to another data value and optionally back to the original data value. The first functional process 15 may be a process that could reveal a secret if attacked by fault injection. For example, the first apparatus 14 may include a central processing unit (CPU) executing the first functional process 15 which moves a cryptographic key from one element to another element and/or compares one string to another string to verify password correctness and/or checks a bit to decide if an operation is allowed or denied. The first functional process 15 may include a cryptographic process such as RSA, AES, keyed-hash message authentication code (HMAC), or a cryptographic hash function, such as SHA-256 or SHA-3. The first apparatus 14 is described in FIGS. 1-4 as a protected apparatus, which is protected by the second apparatus 16. The second apparatus 16 is described in FIGS. 1-4 as a protecting apparatus. In some embodiments, the protecting and protected roles of the first apparatus 14 and the second apparatus 16 may be selectively reversed, as described in more detail with reference to FIG. 5.

The second apparatus 16 is disposed on the silicon chip 12, and is configured to perform a first protecting process 17. The first protecting process 17 may have a first verifiable test result, and optionally a predefined runtime described in more detail below. Examples of the first protecting process 17 may include: (1) an RSA decryption process using a predefined key and data, (2) a cyclic encrypt using AES, HMAC, a cryptographic hash function, such as SHA-256 or SHA-3, or a cyclic redundancy check (CRC) where the output is fed to the input for a given number of times or until the cyclic process is interrupted, and/or (4) a central processing unit (CPU) executing a code section having a predefined result. The first protecting process 17 may be self-verifiable. For example, a data value may be cyclically encrypted and decrypted so that any input data value may be used and the decrypted data checked against the input data value.

In some embodiments, the first functional process 15 and the first protecting process 17 perform different processes.

The first apparatus 14 and the second apparatus 16 have a physical layout which interleaves at least a part 22 of the first apparatus 14 with at least a part 24 of the second apparatus 16 so that an attack on the part 22 of the first apparatus 14 also attacks the part 24 of the second apparatus 16. The silicon chip 12 may include two or more interleaved apparatuses.

In some embodiments, the part 22 of the first apparatus 14, which interleaves with the part 24 of the second apparatus 16, may comprise at least 20% of the area on the silicon chip 12 occupied by the first apparatus 14.

In some embodiments, the functionality of the primary controller 18 may be combined with the second apparatus 16 so that at least a part of the primary controller 18 is interleaved with the part 22 of the first apparatus 14.

The interleaving between elements of the apparatuses 14, 16 may include elements of the first apparatus 14 being, at least partially, enveloped by elements of the second apparatus 16 (and optionally vice-versa). The elements interleaved for protection may include any one or more of the following: combinational logic gates 26, a part of a memory interface 28, volatile memory elements (e.g., memory registers) such as latches, flip-flops, and random-access-memory (RAM), non-volatile memory elements such as one-time-programmable (OTP), Electrically Erasable Programmable Read-Only Memory (EEPROM) and flash memory or any other sensitive element of the first apparatus 14 (or the second apparatus 16). For example, one logic gate of the first apparatus 14 may be interleaved with components of the second apparatus 16.

The apparatuses 14, 16 may include memory registers 30 that are shared (e.g., time-shared) by the first apparatus 14 and the second apparatus 16. The primary controller 18 may periodically assign use of the memory registers 30 between the apparatuses 14, 16.

The use of shared memory registers 30 enhances interleaving of sensitive elements (described in more detail with reference to FIGS. 2A-C) as well as keeping attackers guessing which apparatus they need to attack.

The primary controller 18 may assign the registers 30 so that the different registers assigned to the first apparatus 14 and the second apparatus 16 are interleaved or mixed between the first apparatus 14 and the second apparatus 16 so that an attack on the register assigned to the first apparatus 14 may be detected by the register assigned to the second apparatus 16.

For example, two (or more) sets of interchangeable registers from the memory registers 30 may be defined with one set (or more than one set) serving the first apparatus 14 and one set (or more than one set) serving the second apparatus 16. The two (or more) sets may be reassigned between the first apparatus 14 and the second apparatus 16 periodically.

The memory registers 30 are described in more detail with reference to FIG. 2C.

Each apparatus 14, 16 may also include other memory, microprocessors, and/or logic gates to store states and/or perform processes. The various elements of the apparatuses 14, 16 may, or may not, be interleaved with the elements of the other apparatus 14, 16.

The primary controller 18 is generally disposed on the silicon chip 12, and is configured to signal the second apparatus 16 to perform the first protecting process 17 during a time period that the first apparatus 14 is performing the first functional process 15. The primary controller 18 may run firmware to manage the various processes. In other embodiments, the primary controller 18 includes an application specific hardware processor. In some embodiments, the primary controller 18 is configured to signal the second apparatus 16 to perform the first protecting process 17 all the while that the first apparatus 14 is performing the first functional process 15. The primary controller 18 may manage the time period during which the first protecting process 17 is performed. The primary controller 18 may instruct the second apparatus 16 to perform the first protecting process 17 for a given time period or for a given number of processing cycles based on knowledge of the duration of the first functional process 15. The term "processing cycle" as used in the specification and claims is defined to mean a single execution of the protecting process, which may include one or more operations on a data value, such as a first operation on a data value and then performing an inverse operation on the resulting data value from the first operation.

Alternatively, the primary controller 18 may instruct the second apparatus 16 to perform the first protecting process 17 cyclically until the primary controller 18 interrupts the running of the first protecting process 17 responsively to the first functional process 15 completing. The verifiable test result may be checked at the end of each processing cycle or upon completing the cyclic process (whether the process terminates naturally or through interruption) by the primary controller 18 or by the second apparatus 16 or by a wrapping circuit. In some embodiments, the output of one processing cycle provides the input to the next processing cycle. For the sake of convenience, when the verifiable test result is checked upon completing the cyclic process, the first protecting process 17 typically includes performing a first function yielding an output used as an input to a second function wherein the second function is defined so that the output of the second function equals the input to the first function, for example, encrypting a data value yielding an output and then decrypting the output to yield the original data value. Other similar functions may include, addition followed by subtraction, multiplication followed by division, performing a reciprocal followed by another reciprocal, etc.

The above functions may also be used when the verifiable test result is checked at the end of each processing cycle. Using the above functions, and regardless of when and how the verifiable test result is checked, the input data may change at each protecting process 17 processing cycle (e.g. it may be an incrementing data value or random data) so that a different input value is used each time. In some embodiments, the verifiable test result may be compared to a precalculated expected result. For example, if the protecting apparatus 16 is an AES engine then it may run encryption processing cycles of the same AES key and input data until the execution of the protected functional process 15 is completed.

The primary controller 18 may provide the test data and/or the test result to the second apparatus 16. Execution of the first functional process 15 and the first protecting process 17 is described in more detail with reference to FIGS. 3 and 4.

The attack handling controller 20 is generally disposed on the silicon chip 12. The attack handling controller 20 may run firmware to manage the various processes. In other embodiments, the attack handling controller 20 includes an application specific hardware processor. The attack handling controller 20 is configured to perform a protective action to protect the first functional process 15 responsively to at least the first protecting process 17 failing to provide the first verifiable test result. The first protecting process 17 failing to provide the first verifiable test result provides an indication that the attack is being performed. The protective action, which provides fault injection handling, may include a reset of the first apparatus 14, an interrupt of the first apparatus 14 processing, and/or blocking access to memory of the first apparatus 14.

In embodiments where the first protecting process 17 has a predefined runtime, the attack handling controller 20 may be configured to perform the protective action to protect the first functional process 15 responsively to at least the first protecting process 17 failing to run within a predefined tolerance of the predefined runtime and/or failing to provide the first verifiable test result.

An example follows in which the first protecting process 17 is an RSA process. The elements performing the RSA process are interleaved with elements (e.g. security sensitive elements) of the first apparatus 14, such as any one or more of the following: the memory interface 28, the combinational logic gates 26, volatile memory elements (e.g., memory registers) such as latches, flip-flops, and random-access-memory (RAM), non-volatile memory elements such as one-time-programmable (OTP), Electrically Erasable Programmable Read-Only Memory (EEPROM) and flash memory. The primary controller 18 computes the required runtime of the first protecting process 17, selects an RSA key size, selects a cryptographic key and data seeds. The primary controller 18 instructs the first protecting process 17 to perform the RSA process with the selected data. The first protecting process 17 runs and produces a result. The result or part of it (e.g., one D-word) is recorded. The RSA process may run cyclically while at the end of each processing cycle, the result is compared with the recorded or an otherwise expected result (or a portion of that result).

Execution of the first protecting process 17 may include several options, for example, but not limited to, whether the first protecting process 17 may be interrupted by the primary controller 18, whether a number of processing cycles is checked, and/or whether the verifiable test result is checked by the second apparatus 16 or by the primary controller 18.

Figure 2A:
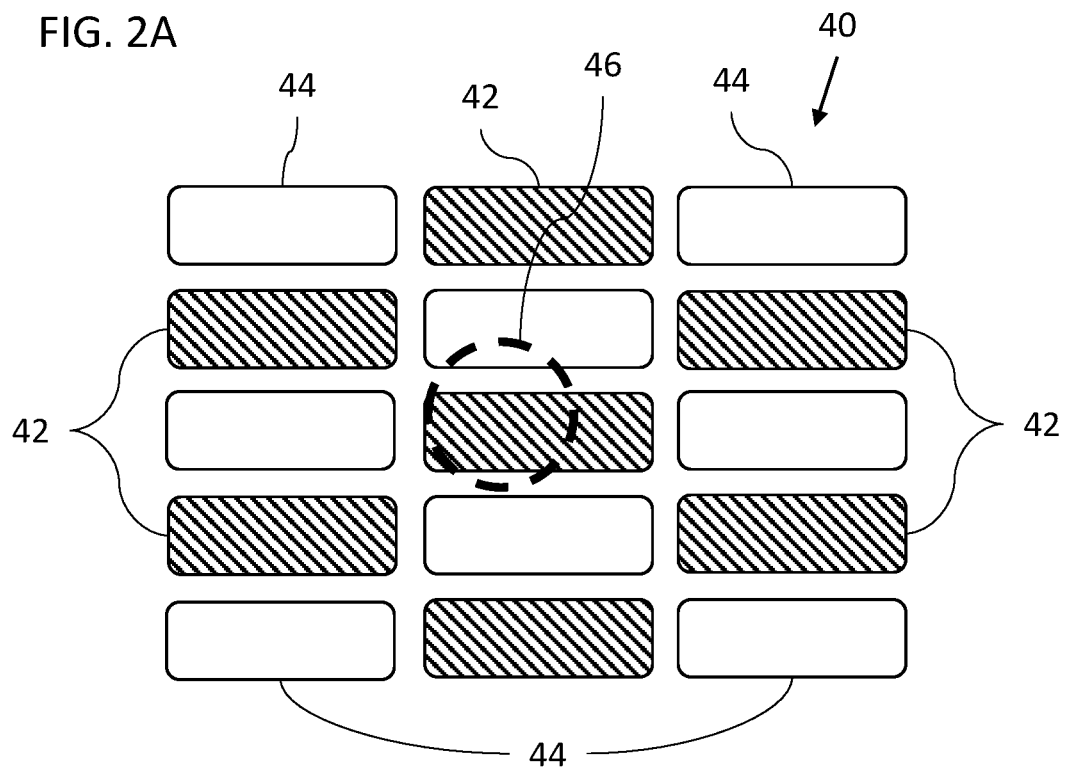
FIGS. 2A-B are various views of interleaved physical layouts in the system of FIG. 1.
Figure 2B:
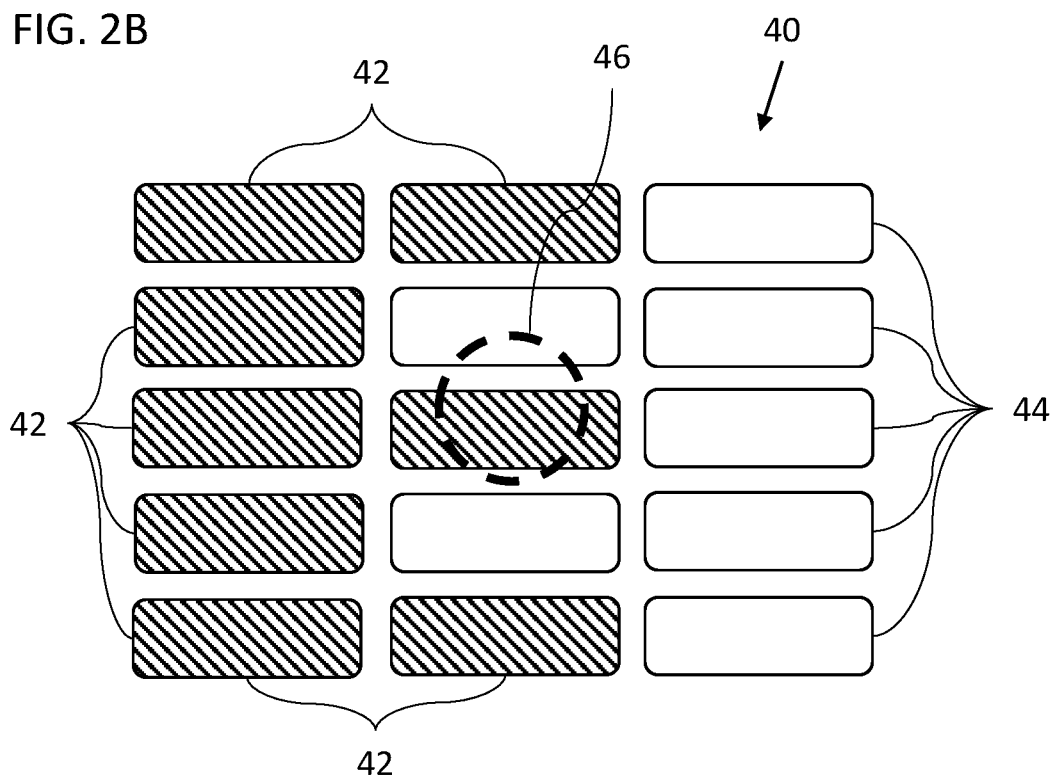

Reference is now made to FIGS. 2A-B, which are various views of interleaved physical layouts 40 in the system 10 of FIG. 1. The physical layouts 40 show various degrees of interleaving the first apparatus 14 with the second apparatus 16 of FIG. 1. Elements 42 of the first apparatus 14 are shown as shaded blocks, while elements 44 of the second apparatus 16 are shown as non-shaded blocks. Each of the FIGS. 2A-B also includes a footprint 46 of an attack that while attacking one of the elements 42 of the first apparatus 14 also attacks one of the elements 44 of the second apparatus 16. For the sake of simplicity only some of the elements 42, 44 are labeled in FIGS. 2A-B. The physical layouts 40 generally protect from an attack when the footprint 46 is larger than a cell (e.g., each of the elements 42). FIG. 2A shows that the elements 42 are fully interleaved with the elements 44 (e.g., the elements 42 are fully enveloped by the elements 44)

providing a high degree of protection against attack. FIG. 2B shows a lower level of interleaving with only some the elements 42 being enveloped by the elements 44, while other elements 42 are not adjacent to the elements 44. The arrangement of FIG. 2B provides some protection against attack, but generally on a lower level than that provided by the arrangement of FIG. 2A. Various levels of protection may be provided in a single implementation according to the security sensitivity of the various elements disposed on the silicon chip 12.

Interleaving of the first apparatus 14 and the second apparatus 16 may be implemented in circuit design and placement as follows. The circuit logic that needs protection is identified, for example, any one or more of the following: sensitive integrated circuit parts such as a CPU or a cryptographic module including a memory interface, volatile memory elements (e.g., memory registers) such as latches, flip-flops, and random-access-memory (RAM), and/or non-volatile memory elements such as one-time-programmable (OTP), Electrically Erasable Programmable Read-Only Memory (EEPROM) and flash memory. The first apparatus 14 is placed in a predefined chip layout region with loose density, e.g., by constraining a placement tool for maximum area utilization of 40% (i.e., constraining that no more than 40% of the silicon area of the designated layout region is occupied with logic cells). Alternatively, the corresponding logic cells can be artificially enlarged before being placed and then shrunk back to their original size after their placement coordinates have been set by the placement tool. A "do not touch" attribute is set for the elements of the first apparatus 14 so that when the second apparatus 16 is placed in the same chip layout region of the silicon chip 12, the elements of the first apparatus 14 are not moved. The utilization of the silicon chip 12 may then be defined to provide a tighter density (e.g., 80%) for the combined elements of the first apparatus 14 and the second apparatus 16. The elements (modules) of the second apparatus 16 are then placed in the same layout region of the first apparatus 14 of the silicon chip 12 so that the elements of the second apparatus 16 are disposed among the elements of the first apparatus 14 in the chip placement design. The chip placement in the design may be amended as necessary prior to manufacturing the silicon chip 12. It should be noted that the utilization percentages may be adjusted according to the proportion sizes of the first apparatus 14 and the second apparatus 16. Interleaving the first apparatus 14 and the second apparatus 16 may lead to timing and area (size) implications. The granularity of interleaving may create a tradeoff between security, which prefers a high-level interleaving, and efficiency of the circuits, which prefers a low level of interleaving.

Reference is now made to FIG. 2C, which is a schematic view of an exemplary embodiment of the memory registers 30 for use in the system 10 of FIG. 1. The memory registers 30 include two flip-flop sets 41, "FF SET1" and "FF SET2", storing states associated with 'n' data paths from the combinational logic gates 26 of the first apparatus 14 and the combinational logic gates 26 of the second apparatus 16. Each of the flip-flop sets 41 is coupled to an input multiplexer 43 and an output multiplexer 45. Multiplexer selectors 47 (SEL_i and SEL_o) are controlled by the primary controller 18 (FIG. 1) during runtime of the protected system 10. The memory registers 30 also include one inverter 49 disposed between SEL_i and one of the input multiplexers 43 and another inverter 51 disposed between SEL_o and one of the output multiplexers 45. In some embodiments, one or more of the inverters 49, 51 may be replaced by switching the connections to the input multiplexer 43 and the output multiplexer 45 in the top half of FIG. 2C or another equivalent arrangement of the components.

The Multiplexer selectors 47, SEL_i and SEL_o, are controlled by the primary controller 18 in coordination to allow different data paths among the combinational logic gates 26 of the first apparatus 14 and among the combinational logic gates 26 of the second apparatus 16. The combinational logic gates 26 of the first apparatus 14 and the second apparatus 16 may be physically interleaved. SEL_i controls which flip-flop sets 41 sample which of the combinational logic gates 26 of the first apparatus 14 versus the second apparatus 16. SEL_o is set to connect the correct flip-flop sets 41 to the corresponding combinational logic gates 26 on the next clock cycle. In one embodiment, SEL_o can be generated by sampling SEL_i according to the clock of the FF SETs 41. For example, referring to FIG. 2C, if in one clock cycle SEL_i is '1', in the next clock cycle SEL_o will be '1', and if in one clock cycle SEL_i is '0', in the next clock cycle SEL_o will be '0'. So, in the example of FIG. 2C, SEL_i is controlled arbitrarily by the primary controller 18 and SEL_o is set accordingly by the primary controller 18. It should be noted that the diagram shown in FIG. 2C is a simplified schematic circuit diagram for example, it does not show other parts of the apparatus which may, or may not, be interleaved or shared, and it does not show all the inputs and outputs of apparatuses 14, 16 to other interfacing logics of system 10.

Figure 3:
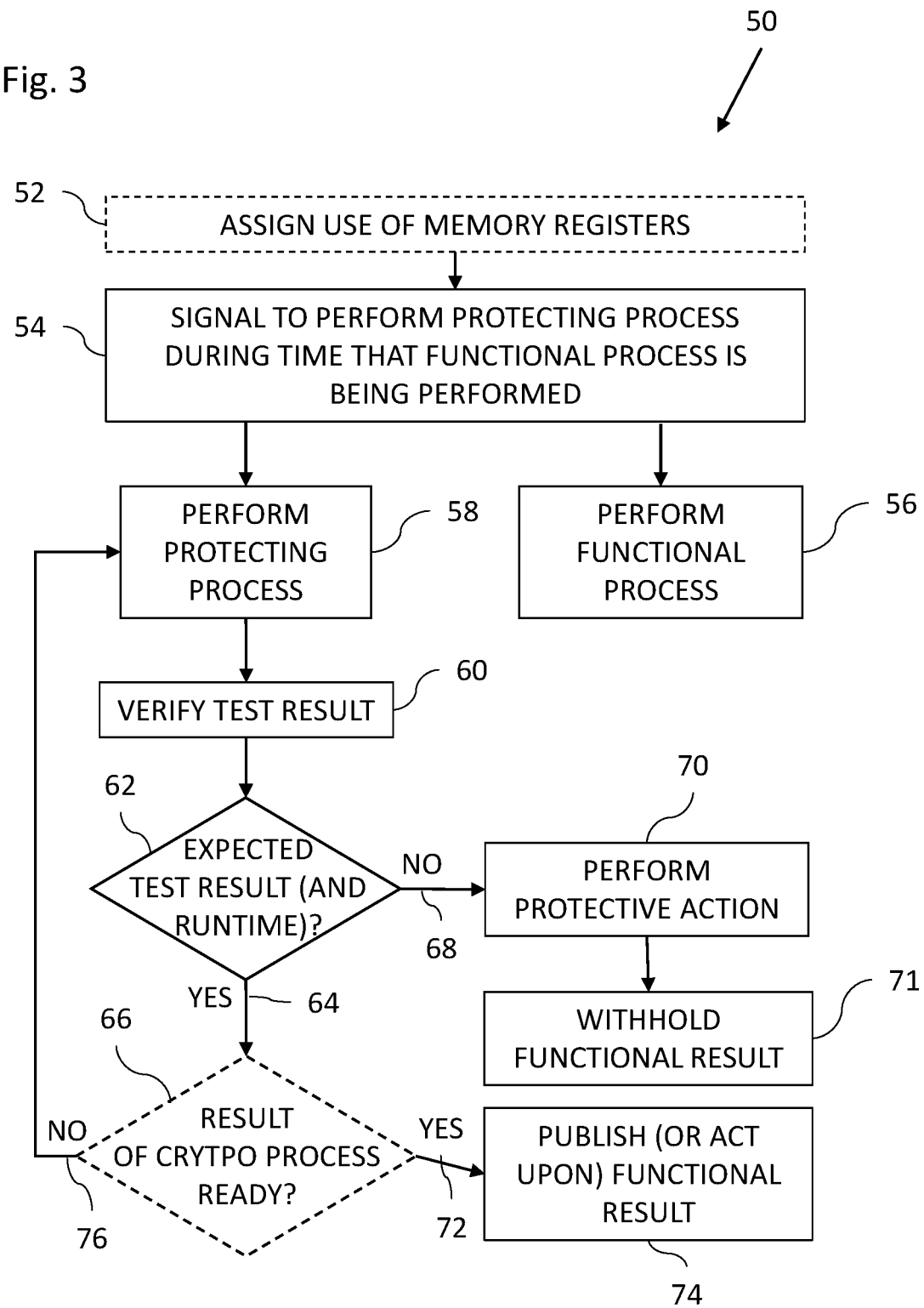
FIG. 3 is a flowchart including exemplary steps in a first method of operation of the system of FIG. 1.

Reference is now made to FIG. 3, which is a flowchart 50 including exemplary steps in a first method of operation of the system 10 of FIG. 1. Reference is also made to FIG. 1. When the silicon chip 12 includes the memory registers 30, the primary controller 18 is configured to assign (block 52) a use of the memory registers 30 between the first apparatus 14 and the second apparatus 16. The primary controller 18 is configured to signal (block 54) the second apparatus 16 to perform the first protecting process 17 during a time period that the first apparatus 14 is performing the first functional process 15. In some embodiments, the primary controller 18 is configured to signal the second apparatus to perform the first protecting process 17 all the while that the first apparatus is performing the first functional process 15.

In some embodiments, the primary controller 18 may instruct the second apparatus 16 to perform the first protecting process 17 for a given number of processing cycles (repetitions) of the first protecting process 17 (or for a given time period) and to verify the verifiable test result each processing cycle. In other embodiments, the primary controller 18 may instruct the second apparatus 16 to perform the first protecting process 17 until the first functional process 15 has completed. Completion of the first functional process 15 by the first apparatus 14 may be monitored by the primary controller 18 and signaled to the second apparatus 16 by the primary controller 18.

The first apparatus 14 is configured to perform (block 56) the first functional process 15 and the second apparatus 16 is configured to perform (block 58) the first protecting process 17. The first functional process 15 and the first protecting process 17 are generally performed in parallel.

The second apparatus 16 and/or the primary controller 18 is configured to verify (block 60) the verifiable test result.

At a decision block 62, if the verifiable test result was verified positively, processing continues (branch 64) with a decision block 66. The decision block 66 checks if the result of the first functional process 15 is ready. If the result is ready (branch 72) the first apparatus 14 or the primary controller 18 is configured to publish (block 74), or act upon, the result of the first functional process 15. For example, the result of the functional process may be authorizing or denying access (e.g., to another process or a secret or any other secured resource) or providing a toggle of an I/O signal that opens a physical lock based on authenticating a password. In such a case, authorizing the access to the other process etc. is delayed until after successful verification of the verifiable test result of the protecting process. If the result of the first functional process 15 is not ready (branch 76), the steps of blocks 58, 60, and 62 are repeated included processing the first protecting process 17 for another processing cycle.

In embodiments where the second apparatus 16 was instructed to perform the first protecting process 17 for a given number of processing cycles (or for a given time period), the decision block 66 is not needed and the result of the first functional process 15 may be published, or acted upon (e.g., to provide access to a restricted resource) automatically after the given number of processing cycles had been performed (or the given time period has expired) and the verifiable test result was positively verified at the end of each processing cycle.

If the verifiable test result was not verified positively (i.e., the first protecting process 17 failed to provide the correct verifiable test result), processing from the decision block 62 continues (branch 68) with the attack handling controller 20 performing a protective action (block 70) to protect the first functional process 15. The primary controller 18 is generally configured to withhold (block 71) a result of the first functional process 15 from being published or prevent acting upon the result (e.g., to provide access to a restricted resource). Therefore, primary controller 18 is configured to control the publication of, or acting upon, the result of the first functional process 15 to be contingent upon the verifiable test result of the first protecting process 17 being equal to an expected result.

Figure 4:
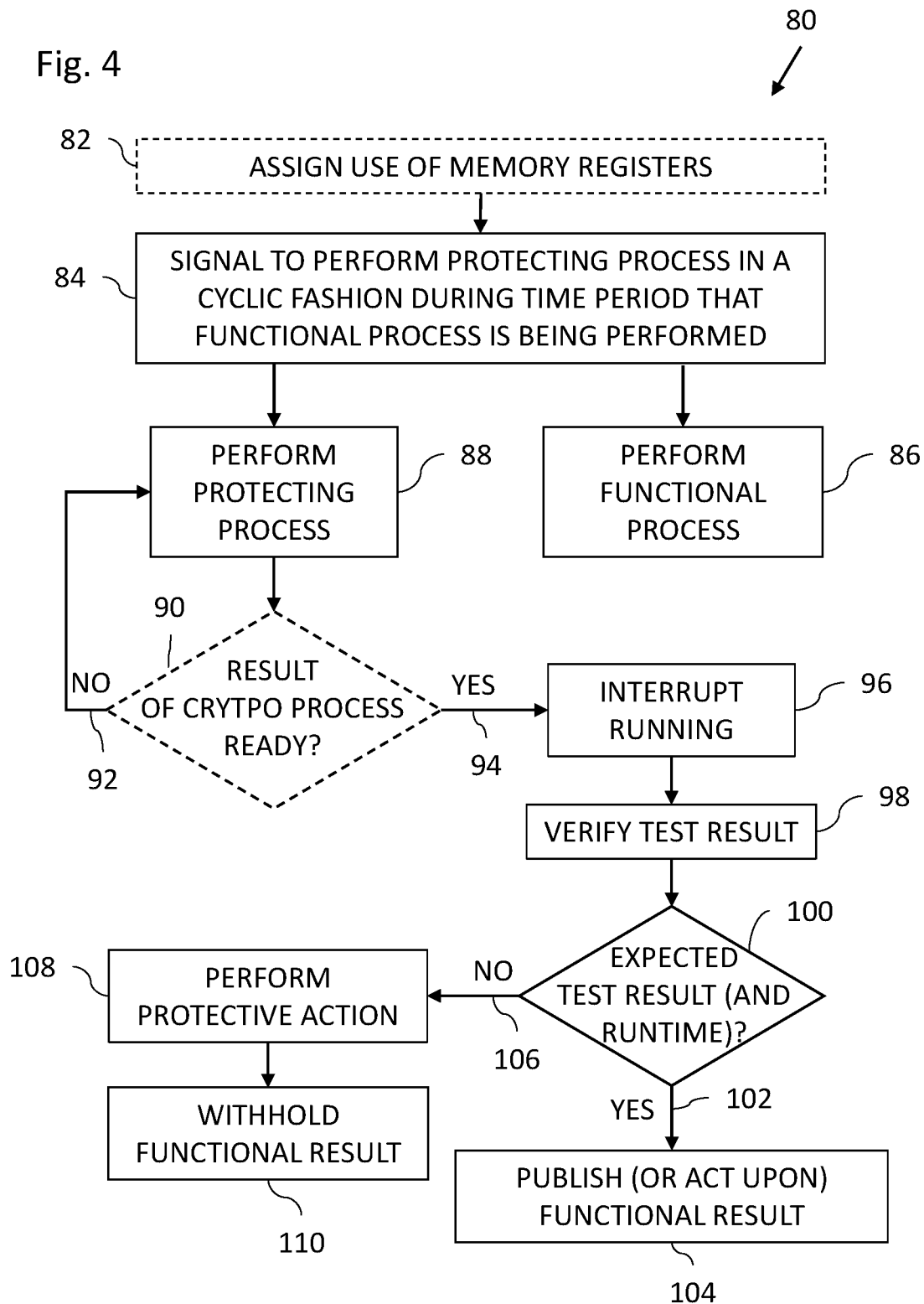
FIG. 4 is a flowchart including exemplary steps in a second method of operation of the system of FIG. 1.

Reference is now made to FIG. 4, which is a flowchart 80 including exemplary steps in a second method of operation of the system 10 of FIG. 1. Reference is also made to FIG. 1.

When the silicon chip 12 includes the memory registers 30, the primary controller 18 is configured to assign (block 82) a use of the memory registers 30 between the first apparatus 14 and the second apparatus 16. The primary controller 18 is configured to signal (block 84) the second apparatus 16 to perform the first protecting process 17 in a cyclic fashion during a time period that the first apparatus 14 is performing the first functional process 15. In some embodiments, the primary controller is configured to signal the second apparatus to perform the first protecting process 17 all the while that the first apparatus is performing the first functional process 15.

In some embodiments, the primary controller 18 may instruct the second apparatus 16 to perform the first protecting process 17 for a given number of processing cycles or for a given time period. In other embodiments, the primary controller 18 may instruct the second apparatus 16 to perform the first protecting process 17 until the first functional process 15 has completed. Completion of the first functional process 15 by the first apparatus 14 may be monitored by the primary controller 18 and signaled to the second apparatus 16 by the primary controller 18 to interrupt the cyclic processing.

The first apparatus 14 is configured to perform (block 86) the first functional process 15 and the second apparatus 16 is configured to perform (block 88) the first protecting process 17 in a cyclic fashion over multiple processing cycles. The first functional process 15 and the first protecting process 17 are generally performed in parallel. It is recommended to commence the first protecting process 17 before, or simultaneously with, the first functional process 15.

At a decision block 90, the primary controller 18 checks if the result of the first functional process 15 is ready. If the result of the first functional process 15 is not ready (branch 92), the step of block 88 is repeated.

If the result is ready (branch 94), the primary controller 18 is configured to interrupt (block 96) running of the first protecting process 17 in response to completion of processing by the first functional process 15. There may be a waiting period while the first protecting process 17 completes its current processing cycle. The second apparatus 16 or the primary controller 18 is configured to verify (block 98) the verifiable test result.

In embodiments where the second apparatus 16 was instructed to perform the first protecting process 17 for a given number of processing cycles or for a given time period, the decision block 90 and the step of block 96 are not needed and the first protecting process 17 is repeated for the given number of processing cycles (or until the end of the given time period) and thereafter continues with the step of block 98.

At a decision block 100, if the verifiable test result was verified positively, processing continues (branch 102) where the first apparatus 14 or the primary controller 18 is configured to publish (block 104), or act upon, the result of the first functional process 15.

If the verifiable test result was not verified positively (i.e., the first protecting process 17 failed to provide the correct verifiable test result), processing from the decision block 100 continues (branch 106) with the attack handling controller 20 performing a protective action (block 108) to protect the first functional process 15. The primary controller 18 is configured to withhold (block 110) a result of the first functional process 15 from being published or prevent acting upon the result (e.g., to provide access to a restricted resource). Therefore, primary controller 18 is configured to control the publication of, or acting upon, the result of the first functional process 15 to be contingent upon the verifiable test result of the first protecting process 17 being equal to an expected result.

Figure 5:
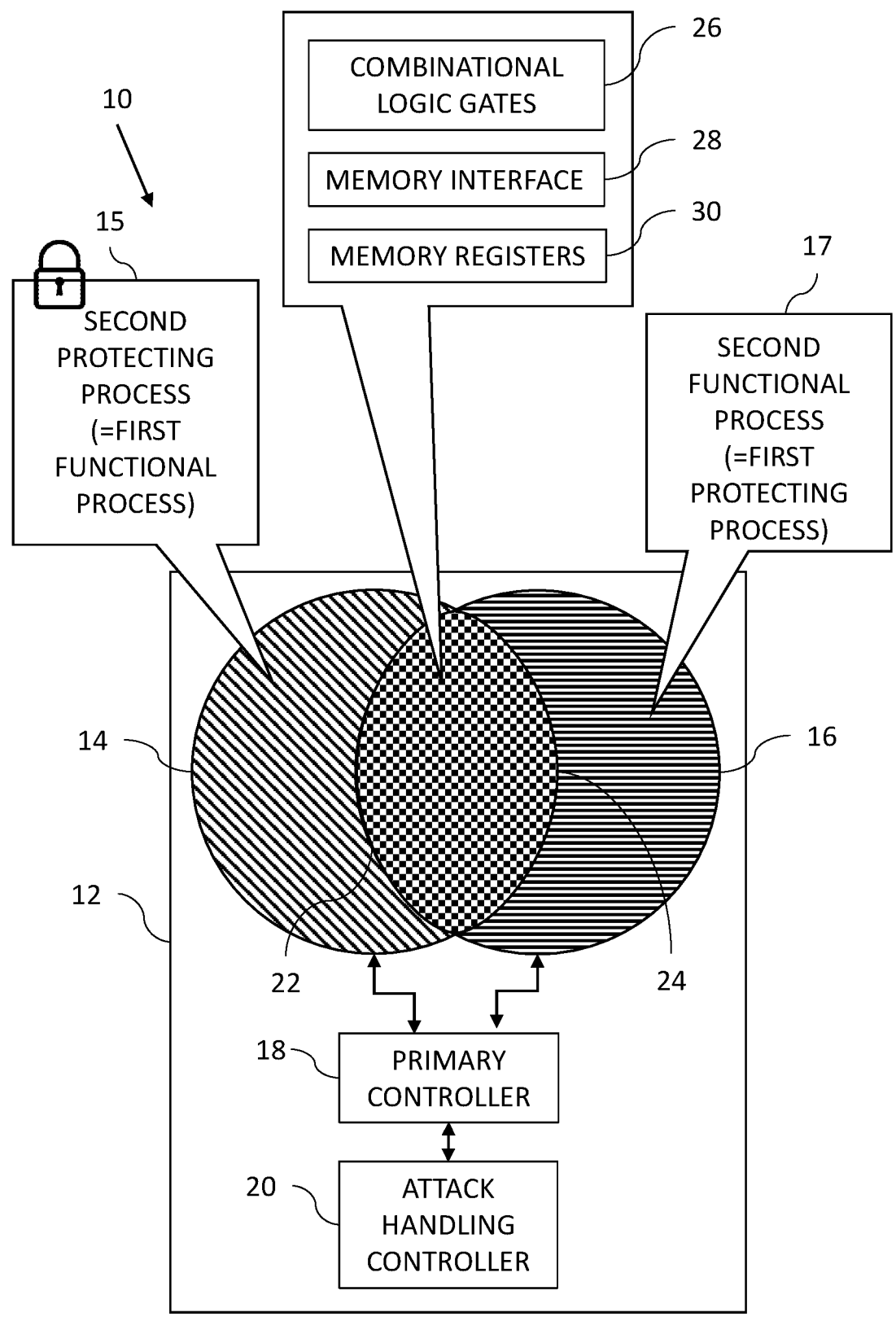
FIG. 5 is a block diagram view of the protected system of FIG. 1 with reversed protection.

Reference is now made to FIG. 5, which is a block diagram view of the protected system 10 of FIG. 1 with reversed protection.

In some embodiments, the roles of the first apparatus 14 and the second apparatus 16 may be selectively reversed so instead of the second apparatus 16 protecting the first apparatus 14, the first apparatus 14 protects the second apparatus 16. Allowing the first apparatus 14 and the second apparatus 16 to selectively provide protecting functions to each other allows using functional modules to protect each other while adding some logic to control the roles of the first apparatus 14 and the second apparatus 16 thereby saving area on the silicon chip 12. In these embodiments, the first functional process 15 is used as a second "protecting" process when required and the first protecting process 17 is used as a second "functional" process processing production data, as the primary use of the protected system 10.

In some embodiments, the primary controller 18 is configured to signal the first apparatus 14 to perform the first functional process 15 as a second protecting process having a second verifiable test result during a time period that the second apparatus 16 is performing a second functional process using the first protecting process 17 so that the first apparatus 14 protects the second apparatus 16 against the attack.

Some of the protecting processes may check their own results, for example, by performing the inverse operation, e.g., encryption followed by decryption etc. In such a case, the first apparatus 14 and the second apparatus 16 may be interleaved with one of the apparatuses 14, 16 protecting the other while both apparatuses 14, 16 perform a functional calculation. In such a case, the primary controller 18 does not necessarily need to signal the first apparatus 14 to perform the first functional process 15 as the second protecting process because the first apparatus 14 is performing the first functional process 15 anyway as a functional process. For example, a CPU may be interleaved with an AES engine. The AES engine performs the inverse operation and compares the result to the original input so now the CPU benefits from the AES engine protection even while the AES is performing a functional process, which is performed at the same time as the functional CPU operation.

The above may be illustrated by way of example. The first apparatus 14 is configured to execute an RSA process and the second apparatus 16 is configured to execute an AES process. When the protected system 10 needs to process data using an RSA process, the first apparatus 14 will perform the RSA process and the second apparatus 16 will provide protection to the RSA process using the AES process. When the protected system 10 needs to process data using an AES process, the second apparatus 16 will perform the AES process and the first apparatus 14 will provide protection to the AES process using the RSA process.

In practice, some or all of the functions of the primary controller 18 and/or the attack handling controller 20 may be combined in a single physical component or, alternatively, implemented using multiple physical components. These physical components may comprise hard-wired or programmable devices, or a combination of the two. In some embodiments, at least some of the functions of may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A protected system, comprising:
a silicon chip;
a first apparatus disposed on the silicon chip, and configured to perform a first functional process;
a second apparatus disposed on the silicon chip, and configured to perform a first protecting process having a first verifiable test result, wherein the first apparatus and the second apparatus have a physical layout which interleaves at least part of the first apparatus with at least part of the second apparatus so that an attack on the at least part of the first apparatus also attacks the at least part of the second apparatus, and wherein the first apparatus is configured to perform the first functional process as a second protecting process having a second verifiable test result during a time period that the second apparatus is performing a second functional process so that the first apparatus protects the second apparatus against the attack;
a primary controller disposed on the silicon chip, and configured to signal the second apparatus to perform the first protecting process during the time period that the first apparatus is performing the first functional process; and
an attack handling controller disposed on the silicon chip, and configured to perform a protective action to protect the first functional process responsively to at least the first protecting process failing to provide the first verifiable test result providing an indication that the attack is being performed.

2. The system according to claim 1, wherein the at least part of the first apparatus, which interleaves with at least part of the second apparatus, comprises at least 20% of an area on the chip occupied by the first apparatus.

3. The system according to claim 1, further comprising memory registers that are shared by the first apparatus and the second apparatus, the primary controller being configured to assign a use of the memory registers between the first apparatus and the second apparatus.

4. The system according to claim 1, wherein the primary controller is configured to signal the second apparatus to perform the first protecting process all the while that the first apparatus is performing the first functional process.

5. The system according to claim 1, wherein the first functional process and the first protecting process perform different processes.

6. The system according to claim 1, wherein the first protecting process has a predefined runtime, the attack handling controller being configured to perform the protective action to protect the first functional process responsively to at least the first protecting process failing to run within a predefined tolerance of the predefined runtime.

7. The system according to claim 1, wherein the first protecting process is configured to run in a cyclic fashion over multiple processing cycles, the primary controller being configured to: interrupt running of the first protecting process in response to completion of processing by the first functional process.

8. The system according to claim 1, wherein the primary controller is configured to control a publication of a second result of the first functional process to be contingent upon the first verifiable test result of the first protecting process being equal to an expected result.

9. The system according to claim 1, wherein the primary controller is configured to control acting upon a second result of the first functional process to be contingent upon the first verifiable test result of the first protecting process being equal to an expected result.

10. The system according to claim 1, wherein the first protecting process includes performing a first function yielding an output used as an input to a second function wherein the second function is defined so that the output of the second function equals the input to the first function.

11. A protecting method, comprising:
performing a first functional process with a first apparatus disposed on a silicon chip;
performing a first protecting process having a first verifiable test result with a second apparatus disposed in the silicon chip, wherein the first apparatus and the second apparatus have a physical layout which interleaves at least part of the first apparatus with at least part of the second apparatus so that an attack on the at least part of the first apparatus also attacks the at least part of the second apparatus;
performing the first functional process as a second protecting process having a second verifiable test result during a time period that the second apparatus is performing a second functional process so that the first apparatus protects the second apparatus against the attack;
signaling the second apparatus to perform the first protecting process during the time period that the first apparatus is performing the first functional process; and
performing a protective action to protect the first functional process responsively to at least the first protecting process failing to provide the first verifiable test result providing an indication that the attack is being performed.

12. The method according to claim 11, wherein the at least part of the first apparatus, which interleaves with at least part of the second apparatus, comprises at least 20% of an area on the chip occupied by the first apparatus.

13. The method according to claim 11, further comprising assigning a use of memory registers, which are shared by the first apparatus and the second apparatus, between the first apparatus and the second apparatus.

14. The method according to claim 11, wherein the signaling includes signaling the second apparatus to perform the first protecting process all the while that the first apparatus is performing the first functional process.

15. The method according to claim 11, wherein the first functional process and the first protecting process perform different processes.

16. The method according to claim 11, wherein the first protecting process has a predefined runtime, the method further comprising performing the protective action to protect the first functional process responsively to at least the first protecting process failing to run within a predefined tolerance of the predefined runtime.

17. The method according to claim 11, wherein the first protecting process is configured to run in a cyclic fashion over multiple processing cycles, the method further comprising interrupting running of the first protecting process in response to completion of processing by the first functional process.

18. The method according to claim 11, further comprising controlling a publication of a second result of the first functional process to be contingent upon the first verifiable test result of the first protecting process being equal to an expected result.

19. The method according to claim 11, further comprising controlling acting upon a second result of the first functional process to be contingent upon the first verifiable test result of the first protecting process being equal to an expected result.

20. The method according to claim 11, wherein the first protecting process includes performing a first function yielding an output used as an input to a second function wherein the second function is defined so that the output of the second function equals the input to the first function.

21. A protected system, comprising:
a silicon chip;
a first apparatus disposed on the silicon chip, and configured to perform a first functional process;
a second apparatus disposed on the silicon chip, and configured to perform a first protecting process having a first verifiable test result, wherein the first apparatus and the second apparatus have a physical layout which interleaves at least part of the first apparatus with at least part of the second apparatus so that an attack on the at least part of the first apparatus also attacks the at least part of the second apparatus, and wherein the first protecting process includes performing a first function yielding an output used as an input to a second function wherein the second function is defined so that the output of the second function equals the input to the first function;
a primary controller disposed on the silicon chip, and configured to signal the second apparatus to perform the first protecting process during a time period that the first apparatus is performing the first functional process; and
an attack handling controller disposed on the silicon chip, and configured to perform a protective action to protect the first functional process responsively to at least the first protecting process failing to provide the first verifiable test result providing an indication that the attack is being performed.

22. A protecting method, comprising:
performing a first functional process with a first apparatus disposed on a silicon chip;
performing a first protecting process having a first verifiable test result with a second apparatus disposed in the silicon chip, wherein the first apparatus and the second apparatus have a physical layout which interleaves at least part of the first apparatus with at least part of the second apparatus so that an attack on the at least part of the first apparatus also attacks the at least part of the second apparatus;
performing the first functional process as a second protecting process having a second verifiable test result during a time period that the second apparatus is performing a second functional process so that the first apparatus protects the second apparatus against the attack, wherein the first protecting process includes performing a first function yielding an output used as an input to a second function wherein the second function is defined so that the output of the second function equals the input to the first function;
signaling the second apparatus to perform the first protecting process during the time period that the first apparatus is performing the first functional process; and
performing a protective action to protect the first functional process responsively to at least the first protecting process failing to provide the first verifiable test result providing an indication that the attack is being performed.

* * * * *